(12) United States Patent
Vickers et al.

(10) Patent No.: US 8,038,212 B2
(45) Date of Patent: Oct. 18, 2011

(54) CHILD VEHICLE SEATING SYSTEM

(75) Inventors: Robert Ian Vickers, Nr. Southwell (GB); Samuel Blackburn Pearce, Nr. Southwell (GB)

(73) Assignee: Space Net Technology Limited, Nottinghamshire (GB)

( * ) Notice: Subject to any disclaimer, the term of this patent is extended or adjusted under 35 U.S.C. 154(b) by 500 days.

(21) Appl. No.: 11/921,720

(22) PCT Filed: Jun. 5, 2006

(86) PCT No.: PCT/GB2006/002057
§ 371 (c)(1),
(2), (4) Date: Mar. 5, 2009

(87) PCT Pub. No.: WO2006/131717
PCT Pub. Date: Dec. 14, 2006

(65) Prior Publication Data
US 2009/0184548 A1    Jul. 23, 2009

(30) Foreign Application Priority Data
Jun. 4, 2005    (GB) .................................. 0511393.1

(51) Int. Cl.
*B60N 2/28*    (2006.01)
(52) U.S. Cl. ................................ 297/250.1; 297/440.11
(58) Field of Classification Search ............... 297/250.1, 297/256.1, 440.11, 452.42, 452.46, 452.63
See application file for complete search history.

(56) References Cited

U.S. PATENT DOCUMENTS

| | | | |
|---|---|---|---|
| 462,055 A | 7/1905 | Barratt | |
| 3,606,453 A | 9/1971 | Cicero | 297/254 |
| 3,995,882 A | 12/1976 | Watkins | 280/649 |
| 4,364,607 A | 12/1982 | Tamburini | 297/452 |
| 4,510,634 A * | 4/1985 | Diedrich et al. | 5/98.3 |
| 4,552,406 A | 11/1985 | Ohl | 297/445 |
| 4,662,038 A | 5/1987 | Walker | 24/460 |
| 5,183,311 A | 2/1993 | Meeker et al. | 297/151 |
| 5,445,254 A | 8/1995 | Charles | 192/17 R |
| 5,775,772 A | 7/1998 | Lefranc | 297/250.1 |
| 5,785,382 A * | 7/1998 | Barker | 297/250.1 |
| 5,806,924 A * | 9/1998 | Gonas | 297/216.11 |
| 5,915,787 A | 6/1999 | Brookman | 297/256.13 |
| 5,964,502 A | 10/1999 | Stephens | 297/250.1 |
| 6,315,364 B1 * | 11/2001 | Fujita et al. | 297/452.56 |
| 6,378,944 B1 | 4/2002 | Weisser | 297/440.11 |
| 6,439,665 B1 | 8/2002 | Cvek | 297/440.11 |
| 6,568,755 B1 | 5/2003 | Groening | 297/256.13 |

(Continued)

FOREIGN PATENT DOCUMENTS
CN    2294195    10/1998
(Continued)

OTHER PUBLICATIONS

English translation of Official Action dated Sep. 18, 2009 for Chinese Patent Application No. 2006800277925, 4 pages.

(Continued)

*Primary Examiner* — Peter R. Brown
(74) *Attorney, Agent, or Firm* — C. G. Mersereau; Nikolai & Mersereau, P.A.

(57) ABSTRACT

A child vehicle seating system, for fitment on a vehicle seat to support and restrain a child, comprises at least one seating component. Each seating component includes a closed frame over which a flexible membrane is stretched to define a support surface.

15 Claims, 13 Drawing Sheets

U.S. PATENT DOCUMENTS

| | | | |
|---|---|---|---|
| 6,575,492 B2 * | 6/2003 | Davidson | 280/647 |
| 6,623,074 B2 | 9/2003 | Asbach et al. | 297/250.1 |
| 6,623,079 B2 | 9/2003 | Gregory | 297/440.11 |
| 6,726,286 B2 * | 4/2004 | Stumpf et al. | 297/452.64 |
| 6,827,399 B2 * | 12/2004 | Schoor et al. | 297/250.1 |
| 6,908,151 B2 | 6/2005 | Meeker et al. | 297/250.1 |
| 6,942,300 B2 | 9/2005 | Numa et al. | 297/452.56 |
| 6,966,606 B2 * | 11/2005 | Coffield | 297/452.56 |
| 7,152,929 B2 * | 12/2006 | Wu | 297/452.56 |
| 7,278,683 B2 | 10/2007 | Williams et al. | 297/250.1 |
| 2003/0151219 A1 | 8/2003 | Simard | 280/47.35 |
| 2004/0231129 A1 | 11/2004 | VanDeRiet et al. | 29/448 |
| 2005/0127735 A1 | 6/2005 | Munsch | 297/391 |
| 2006/0071453 A1 * | 4/2006 | Myers et al. | 280/652 |

FOREIGN PATENT DOCUMENTS

| | | |
|---|---|---|
| CN | 1349909 A | 5/2002 |
| DE | 4140638 | 6/1993 |
| DE | 19527351 | 1/1997 |
| DE | 29708736 U | 7/1997 |
| DE | 20203348 U | 8/2002 |
| EP | 0751033 | 1/1997 |
| EP | 0908370 | 4/1999 |
| EP | 0931691 | 7/1999 |
| EP | 1122120 | 8/2001 |
| EP | 1295582 | 3/2003 |
| EP | 1336531 | 8/2003 |
| FR | 2277711 | 2/1976 |
| GB | 623055 | 5/1949 |
| GB | 2099376 | 12/1982 |
| GB | 2186907 | 8/1987 |
| GB | 2216402 | 10/1989 |
| GB | 2361865 | 11/2001 |
| JP | 9039627 | 2/1997 |
| JP | 2001105942 | 4/2001 |
| JP | 2002087121 | 3/2002 |
| JP | 2002211298 | 7/2002 |
| JP | 2002253391 | 9/2002 |
| JP | 200372435 | 3/2003 |
| WO | WO9819579 | 5/1998 |
| WO | WO2004000602 | 12/2003 |
| WO | WO2005053998 | 6/2005 |

OTHER PUBLICATIONS

Official Action dated Sep. 18, 2009 for Chinese Patent Application No. 2006800277925, 4 pages.

English translation of Official Action dated Apr. 2, 2010 for Chinese Patent Application No. 2006800277925, 4 pages.

Official Action dated Apr. 2, 2010 for Chinese Patent Application No. 2006800277925, 4 pages.

British Search Report for Application No. GB0605917.4, Jun. 9, 2006, 2 pages.

British Search Report for Application No. GB0511393.1, Jul. 28, 2005, 5 pages.

English translation of Official Action dated Apr. 3, 2009 for Chinese Patent Application No. 2006800277925, 7 pages.

Official Action dated Apr. 3, 2009 for Chinese Patent Application No. 2006800277925, 36 pages.

English translation of Official Action dated Apr. 3, 2009 for Chinese Patent Application No. 2006800279634, 7 pages.

Official Action dated Apr. 3, 2009 for Chinese Patent Application No. 2006800279634, 44 pages.

PCT International Search Report, European Patent Office, Date of Actual Completion of the International Search Aug. 16, 2006, includes Notification of Transmittal, 5 pages.

* cited by examiner

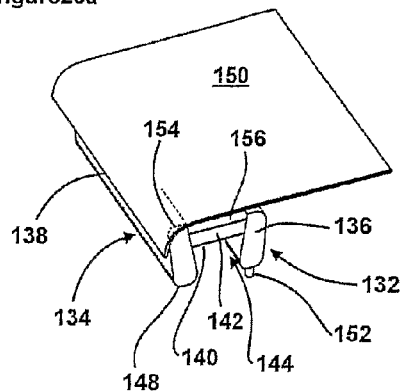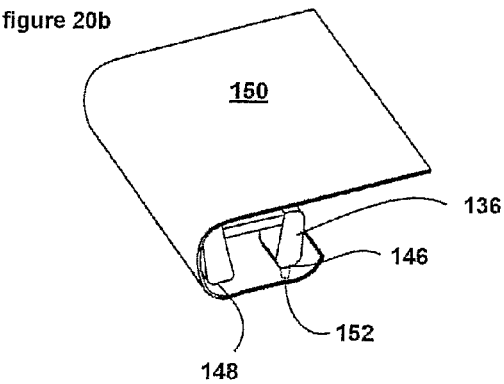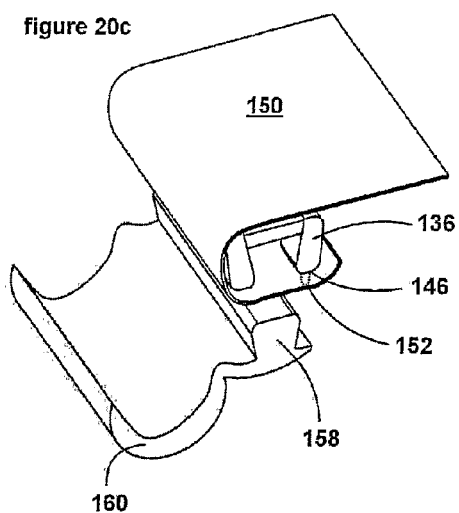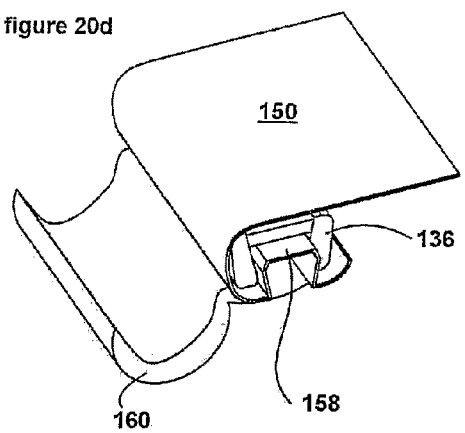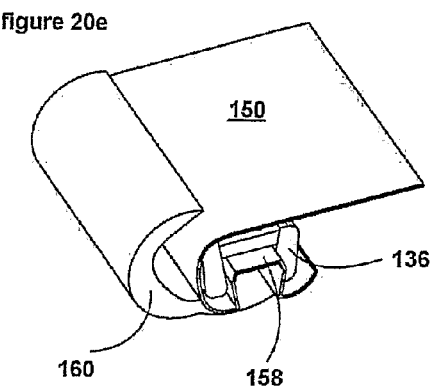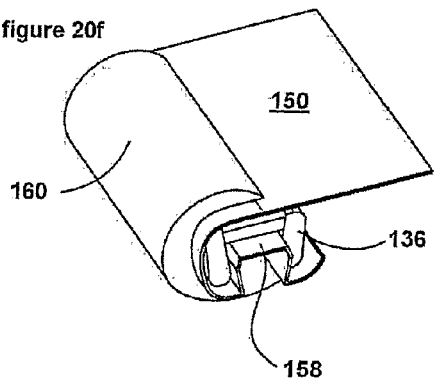

CHILD VEHICLE SEATING SYSTEM

CROSS-REFERENCE TO RELATED APPLICATION

This application is related to co-pending U.S. application Ser. No. 11/921,719, filed Dec. 4, 2007, and entitled "PUSH-CHAIR".

The present invention relates to a child vehicle seating system for fitment on a vehicle seat to support and restrain a child.

Conventionally, child car seats, booster seats and infant carriers intended for attachment to a vehicle seat in order to restrain and support a child in a vehicle have been constructed as a relatively solid support component over which a padded covering is fitted to provide a comfortable seat. Since the support component is generally moulded from a plastics material, the seats/carriers are often bulky and relatively heavy.

Such seats/carriers are secured in position on a vehicle seat by means of a conventional seat belt (i.e. a seat belt having three anchor points so as to define a shoulder strap and a waist strap) passing through fitment points provided on the rear surface of the support component. The bulk and weight of the seats/carriers can cause problems during this fitment process since they are difficult to manoeuvre and users find it difficult to see behind them in order to correctly locate the seat belt. In a recent survey, over 70% of seats/carriers were formed to be fitted incorrectly.

The use of a relatively solid support component in combination with a padded cover also means that the seats/carriers are poorly ventilated and does not therefore assist in ensuring that a child seated therein does not overheat. Furthermore, the padded cover is often cumbersome and can prove difficult to remove, wash and replace, thereby deterring the user from trying.

According to an aspect of the invention there is provided a child vehicle seating system, for fitment on a vehicle seat to support and restrain a child, comprising at least one seating component, the or each seating component including a closed frame over which a flexible membrane is stretched to define a support surface.

The provision of at least one seating component including a support surface defined by a flexible membrane stretched over a closed frame mean that a solid support member is not required. This enables the provision of a seating system that is considerably lighter and less bulky than hereto known seats/carriers.

Preferably, the child vehicle seating system includes at least first and second separate seating components interconnected to define a seat and a back, each seating, component including a closed frame over which a flexible membrane is stretched to define a support surface.

The child vehicle seating system may also include a third seating component having a closed frame over which a flexible membrane is stretched to define a support surface, the third seating component being connected to the second seating component to define a head rest.

The or each of the closed frames is preferably shaped such that the flexible membrane stretched over the frame forms a contoured support surface. The provision of a flexible membrane tensioned over a shaped frame enables the seating component to be shaped in order to curve around a child when the child is seating in the searing system and thereby improve the support provided by the seating components.

It also enables the seating components to be shaped to minimize the amount of contact between a child supported by the seating system and solid components. Consequently, the overall comfort of the seating system can be improved and the likelihood of pressure injuries, such as bruises and grazes, which may otherwise occur through contact with solid components, particularly in the event of a vehicular accident, can be reduced.

References herein to a closed frame are intended to refer to a continuous frame bounding a hollow interior, which may include two or more opposed frame elements connected end to end to form a closed frame.

Preferably the flexible membrane is formed from a porous, breathable, fabric. This ensures that the seat is ventilated and thereby reduces the risk of a child supported by the seating system overheating as a result of high ambient temperatures.

In a particularly preferred embodiment, the porous, breathable, fabric is a mesh fabric that allows a user to see through the seating components. This can be particularly advantageous during the fitment process of the seating system on a vehicle seat since it allows the user to see behind the seating components.

Preferably the first and second seating components are interconnected by means of a connecting arrangement including a floor-engaging support member such that the seating system is self-supporting.

References herein to a vehicle seat belt are intended to refer to a conventional vehicle seat belt having three anchor points so as to define a shoulder strap and a waist strap.

Other advantageous features will become apparent from the following description of preferred embodiments of the invention, provided by way of illustrative examples only, with reference to the accompanying drawing in which.

Figure 1:
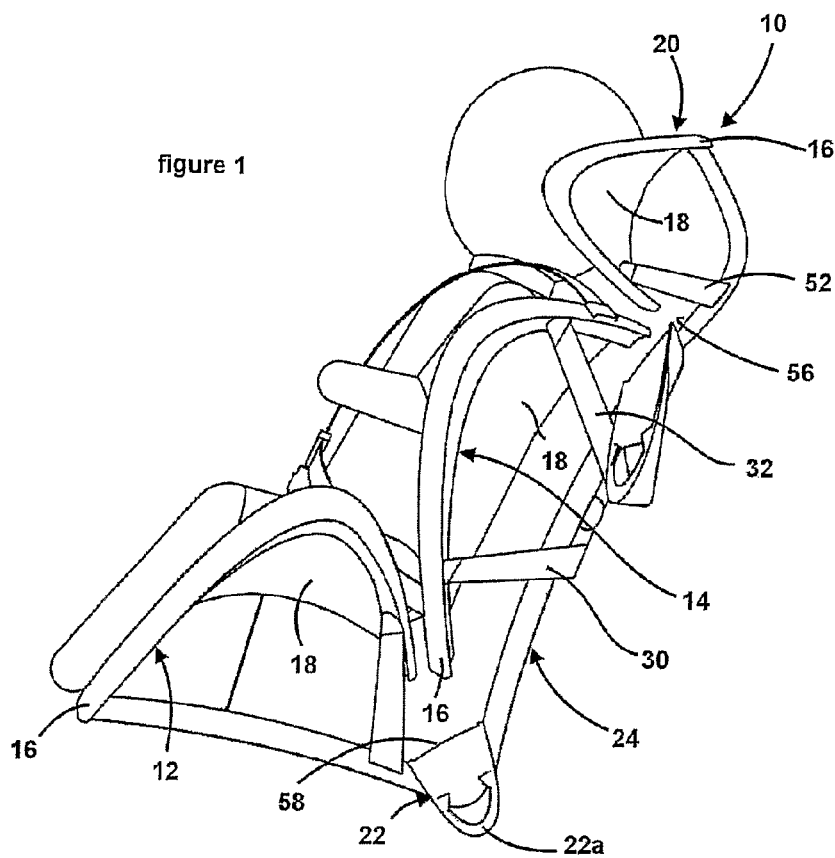
FIGS. 1 and 2 show a seating system according to an embodiment of the invention.
Figure 2:
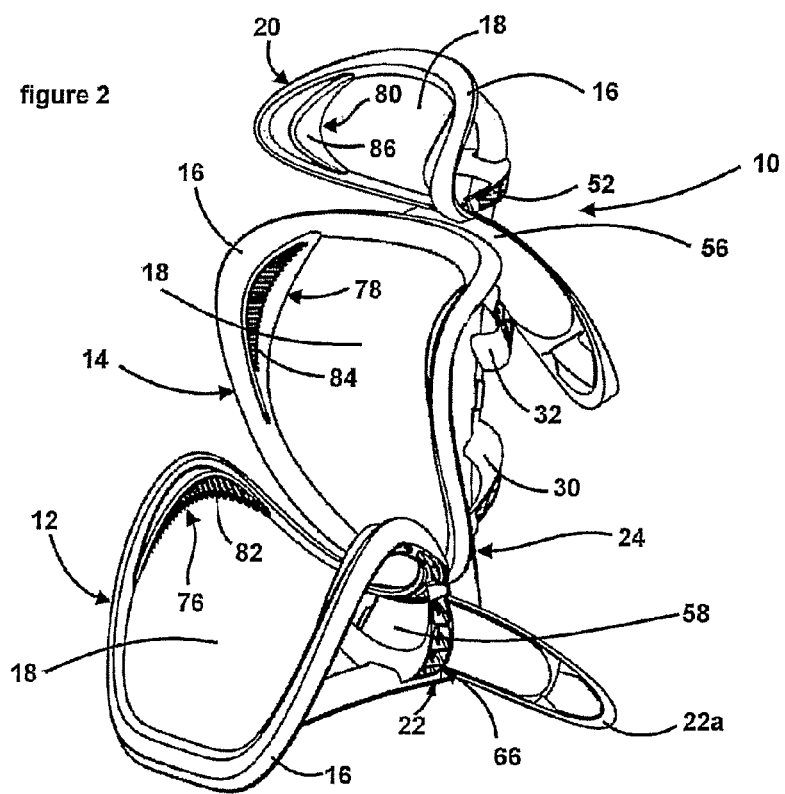
Figure 9A:
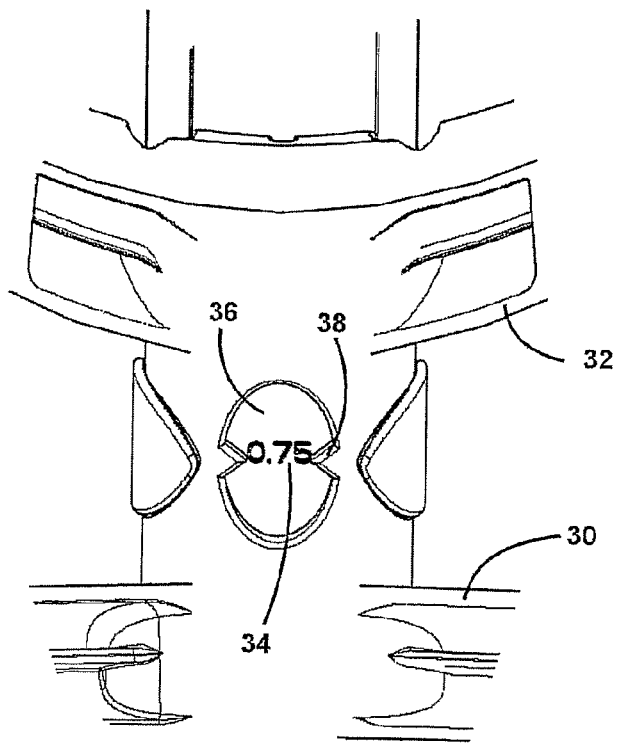
Figure 9B:
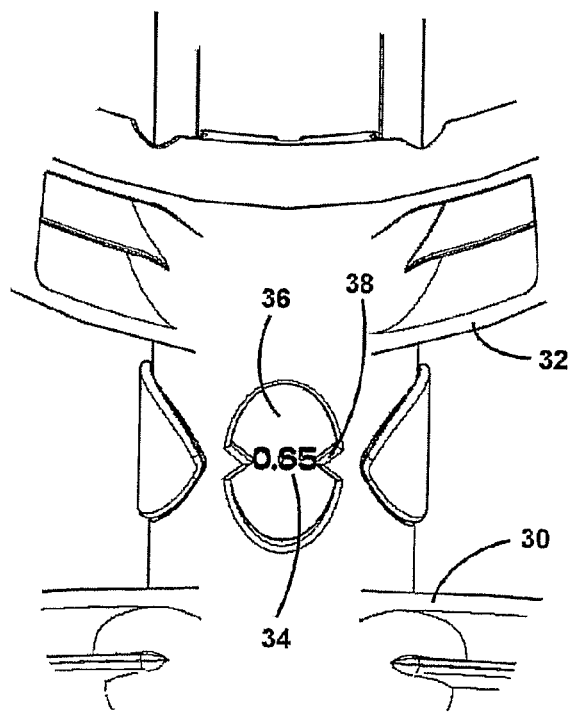
Figure 11:
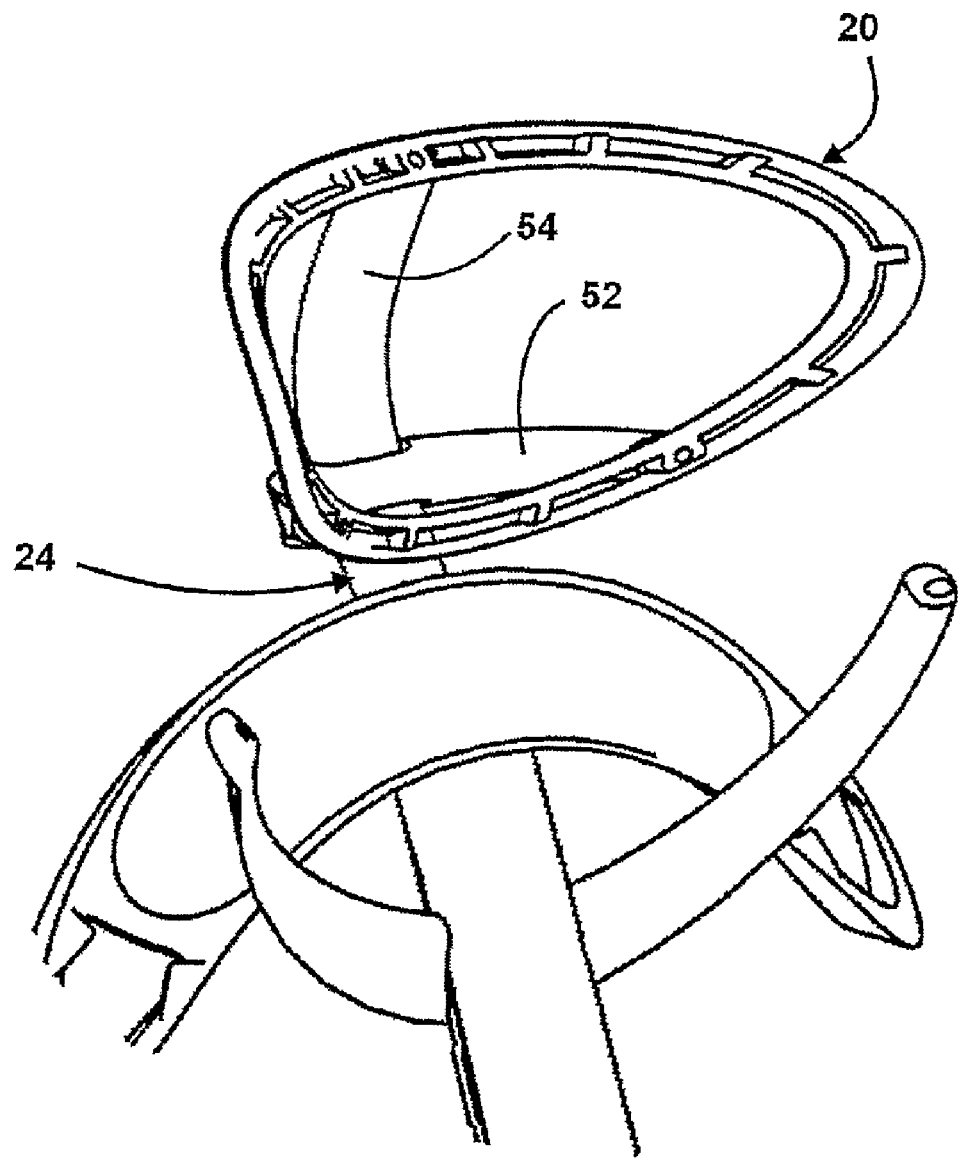
Figure 12A:
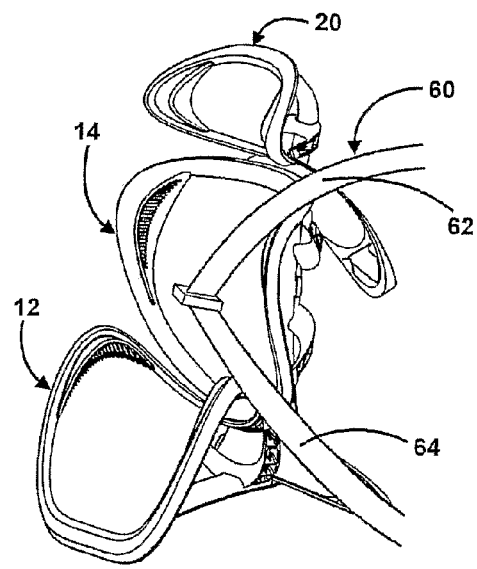
Figure 12B:
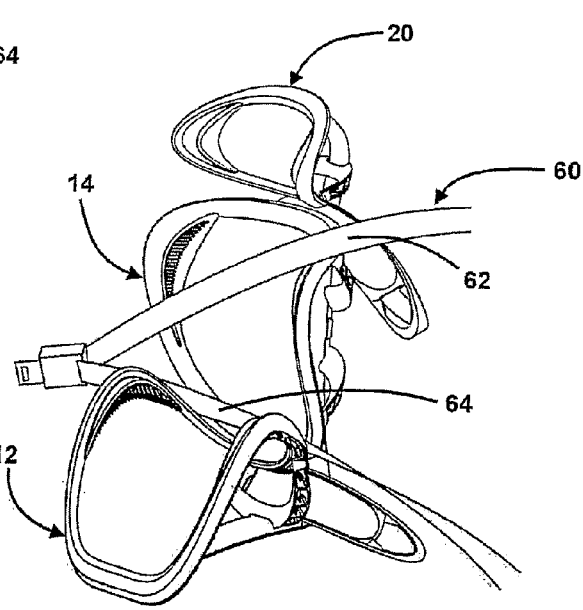
Figure 12C:
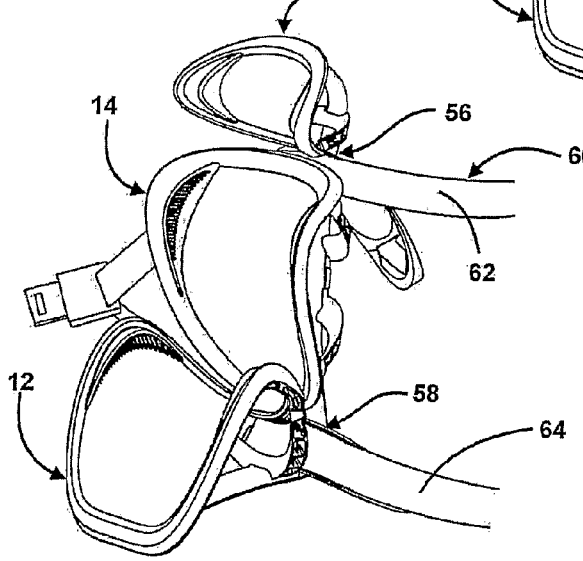
Figure 13:
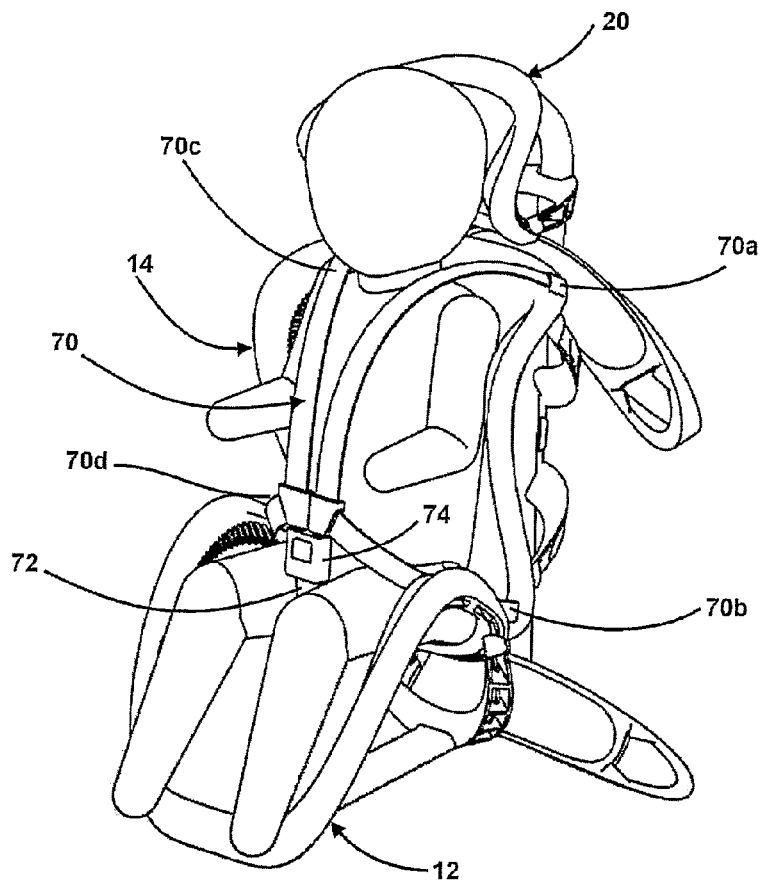
Figure 14:
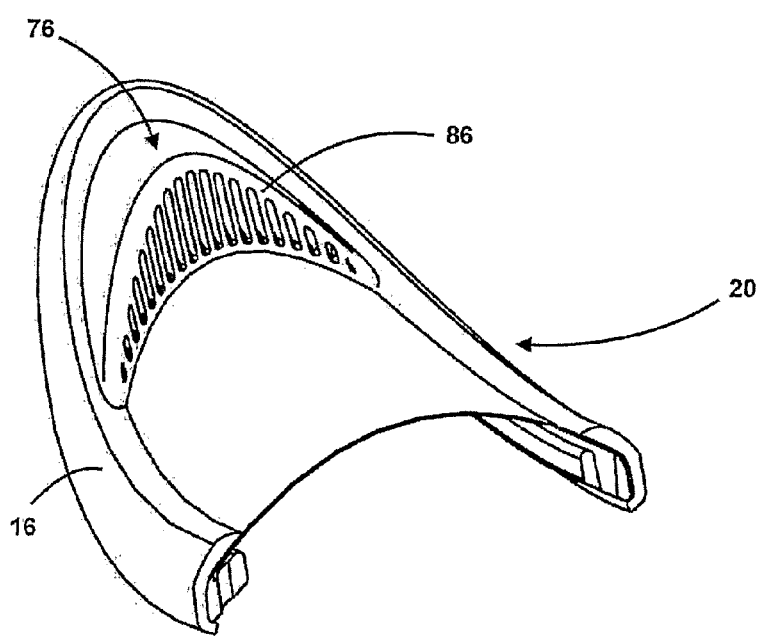
Figure 19:
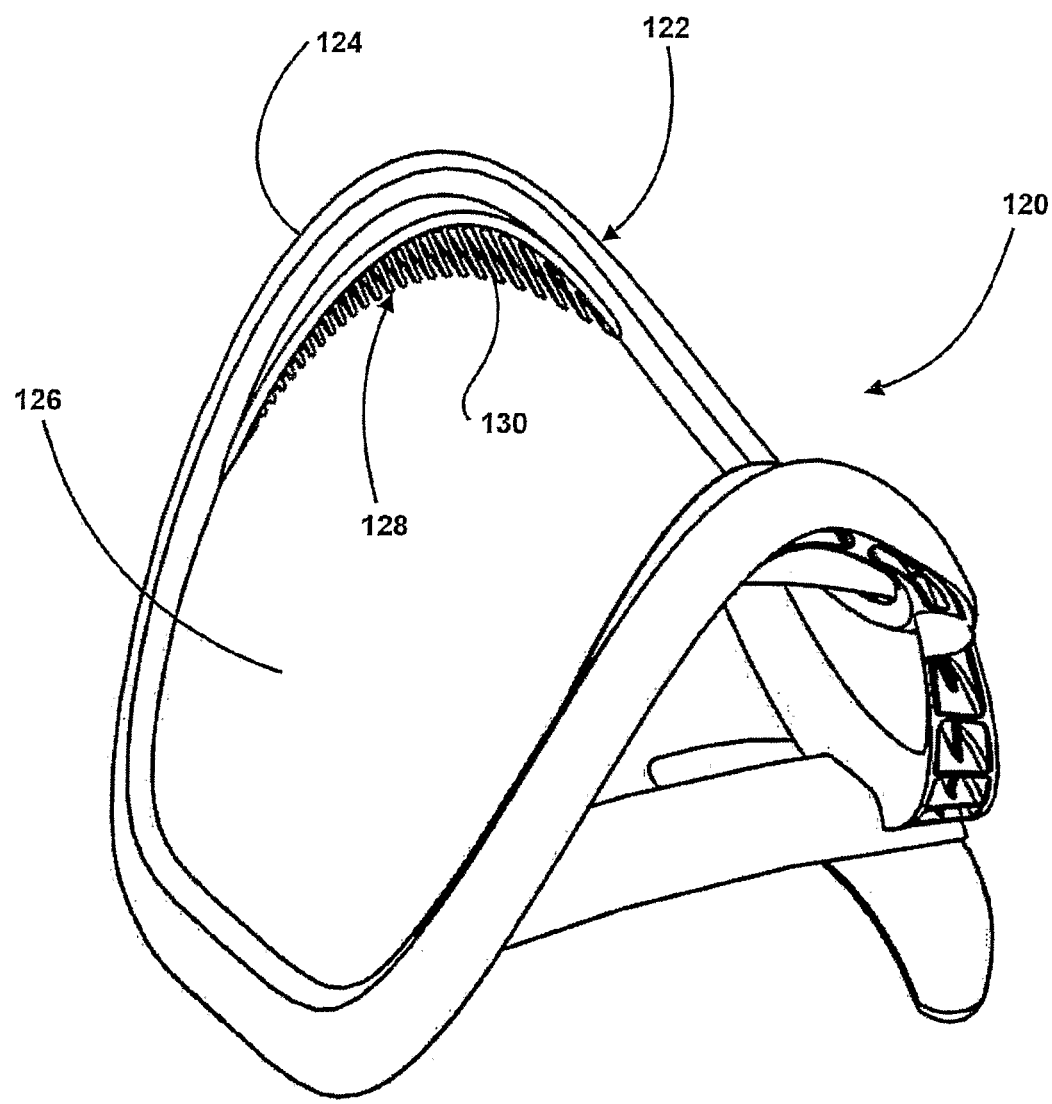

FIGS. 9*a* and 9*b* show a connector member of the seating system of FIGS. 1 and 2;

FIGS. 10*a*-10*d* show a locking system allowing adjustment of the relative positions of the first and second seating components;

FIG. 11 shows a locking system allowing adjustment of the relative positions of the second and third seating components;

FIGS. 12*a*-12*c* show the seating system of FIGS. 1 and 2 during fitment on a vehicle seat;

FIG. 13 shows the seating system of FIGS. 1 and 2 including an exemplary child support harness;

FIG. 14 shows a partial view of a third seating component of a seating system according to another embodiment of the invention;

FIGS. 15-18 show a seating system according to a further embodiment of the invention;

FIG. 19 shows a seating system according to a yet further embodiment of the invention; and FIGS. 20*a*-20*f* show a frame element.

A child vehicle seating system 10 for fitment on a vehicle seat to support and restrain a child, according to an embodiment of the invention, is shown in FIGS. 1 and 2.

The seating system 10 includes first and second seating components 12, 14 interconnected to define a seat and a back, each seating component 12,14 including a closed frame 16 over which a flexible membrane 18 is stretched to define a support surface.

In the embodiment shown in FIGS. 1 and 2, the seating system 10 also includes a third seating component 20 having a closed fame 16 over which a flexible membrane 18 is stretched to define a support surface, the third seating component 20 being cote to the second sewing component 14 to define a head rest.

The closed frame 16 of each of the seating components 12,14,20 is preferably shaped such that the flexible membrane 18 stretched over the frame 16 forms a contoured support surface.

Figure 3:
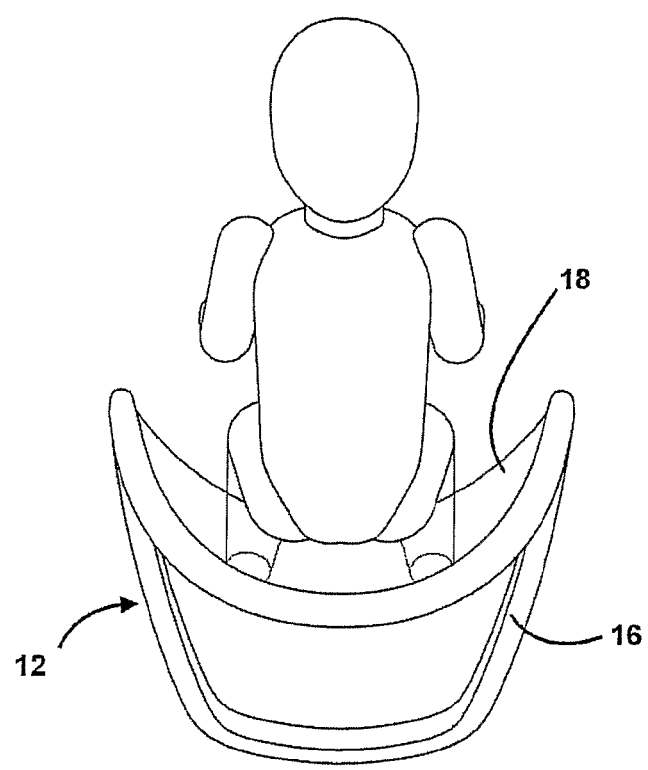
FIG. 3 shows a first seating component of the seating system of FIGS. 1 and 2.
Figure 4:
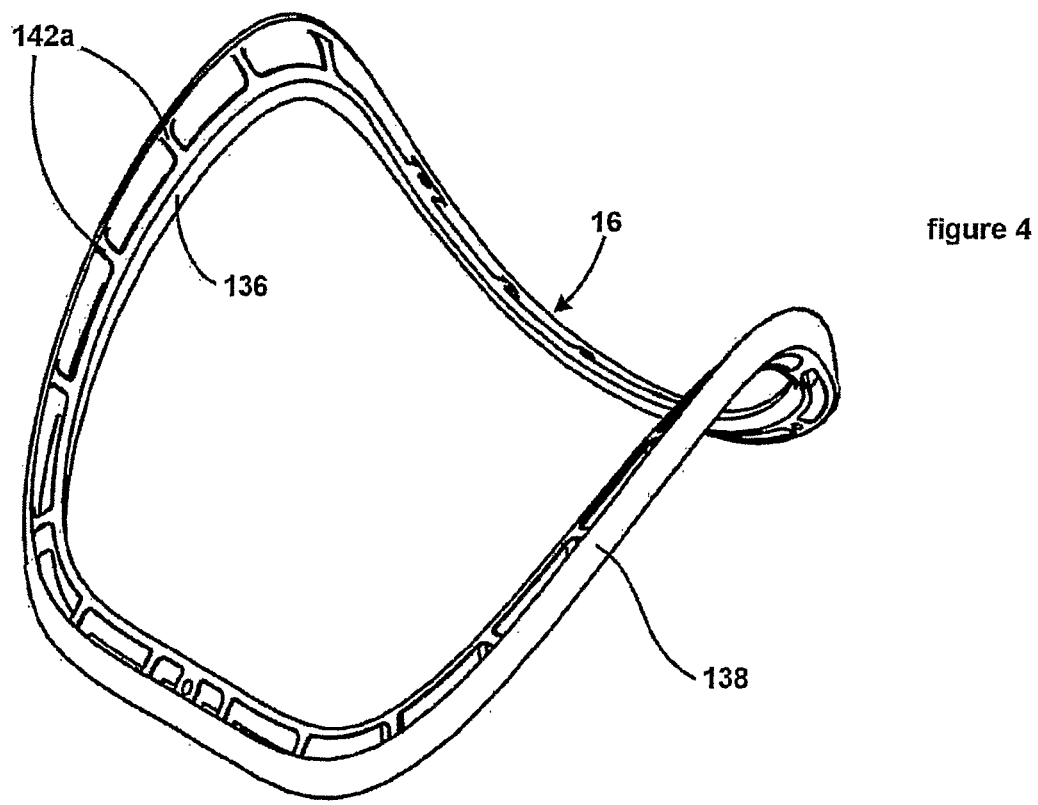
FIG. 4 shows a closed frame of the first seating component of FIG. 3.

In the embodiment shown in FIGS. 1 and 2, the frames 16 of the seating components 12,14,20 are shaped to curve around a child seated in tie seating system 10 to support the child and resist sideways movement of the child relative to the seating components 12,14,20. This is exemplified in FIGS. 3 and 4, which show the seating component 12 forming the seat of the seating system 10 (FIG. 3) and the corresponding frame 16 (FIG. 4).

In the embodiment shown in FIGS. 1 and 2, the frames 16 of the seating components 12,14,20 are also shaped so that the support provided by each of the seating components 12,14,20 is provided entirely by the contoured support surface defined by the flexible membrane 18 stretched over the associated frame 16. This arrangement minimizes the amount of contact between a child seated in the seating system 10 and solid components (e.g. the frames 16). It therefore minimizes the risk of discomfort or injuries that may otherwise result from contact between a child seated in the seating system 10 and solid components in the seating system 10.

The flexible membrane 18 stretched over the frame 16 of each of the seating components 12,14,20 is preferably a porous, breathable fabric to ventilate the seating components 12,14,20, and thereby minimize the risk of a child seated in the seating system 10 from overheating in high ambient temperatures.

In the embodiment shown in FIGS. 1 and 2, the flexible membrane 18 is a porous breathable fabric in the form of a mesh fabric.

The use of flexible membranes 18 in the form of mesh fabric is advantageous during fitment of the seating system 10 on a vehicle seat since it enables the user to see through the seating components 12,14,20 to ensure that the seating system is located correctly on the vehicle seat without having to look behind the seating components.

The first and second components 12,14 of the seating system 10 are preferably connected by means of a connecting arrangement, which includes a floor engaging support 22.

The floor-engaging support 22 preferably assists in maintaining the seating system 10 in an upright position when placed on a flat surface, such as the floor.

In the embodiment shown in FIGS. 1 and 2, the connecting arrangement includes a support frame 24 interconnecting the seating components 12,14,20. The support frame 24 is a curved tubular structure connected to the first seating component 12 forming the seat, by means of the floor engaging support 22, and extending generally upwards, behind the second seating component 14 forming the back, to the third seating component 20 forming the head rest.

The connecting arrangement also preferably includes first and second connector members 30,32 extending between the second seating component 14 and the support frame 24 to mount the second seating component 14 on the support frame 24 for sliding movement along the length of the support frame 24. The first connector member 30 is fixed at one end towards the bottom of the second seating component 14 and is slidably mounted at its other end on the support frame 24. The second connector member 32 is fixed at one end towards the top of the second seating component 14 and is slidably mounted at its other end on the support same 24.

Figure 5:
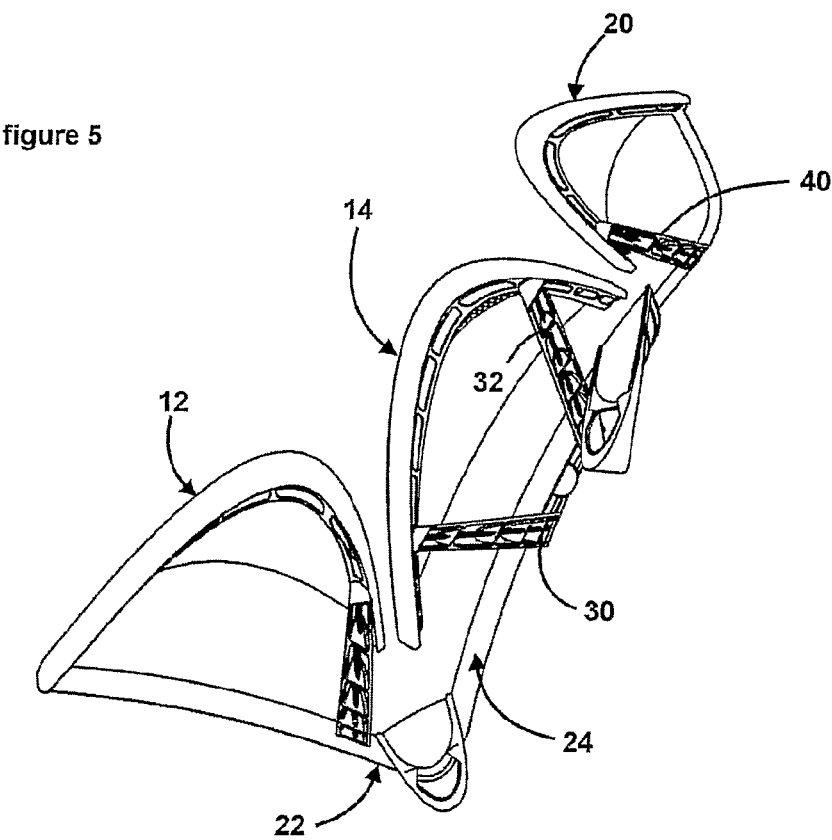
FIGS. 5 and 6 show the seating system of FIGS. 1 and 2 before and after adjustment of the relative positions of second and third seating components.
Figure 6:
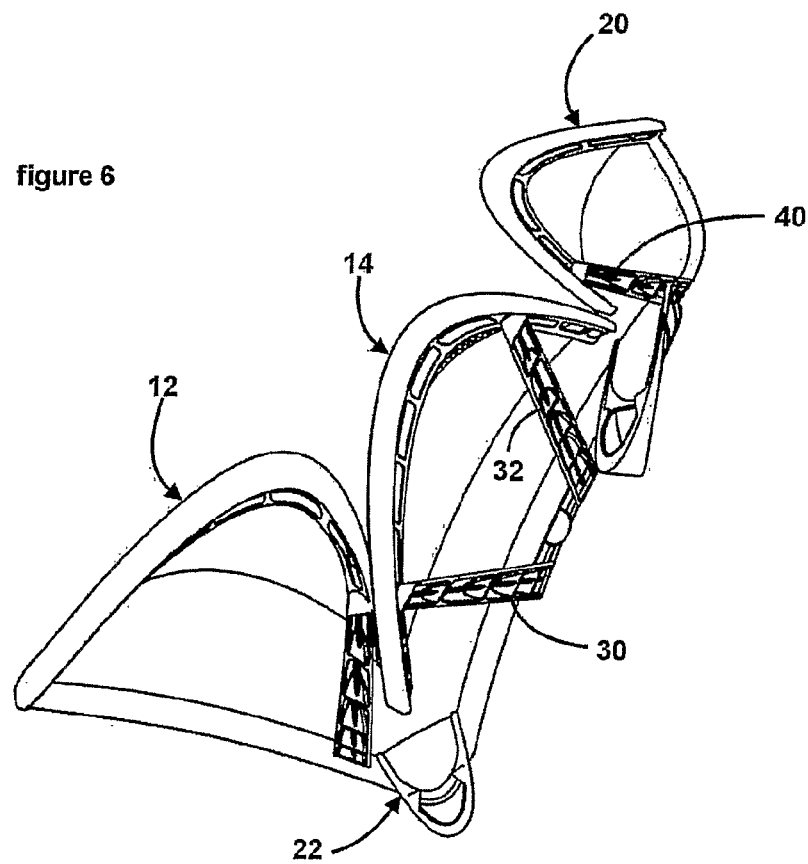

Sliding engagement between the connector members 30,32 and the support fame 24 provides means for adjust the position of the second seating component 14 relative to the first seating component 12, as exemplified by the relative positions of the seating components 12,14 shown in FIGS. 5 and 6.

Preferably, the second seating component 14 is adjustable through a range of predetermined positions relative to the fist seating component 12 to accommodate children of different heights in the seating system 10. This helps to ensure that the correct ergonomic seating position for a child of a given height is provided.

To assist adjustment of the position of the second seating component 14 relative to the first seating component 12, a scale 34 may be marked on the support fame 24 identifying positions of the second connector member 32 on the support frame 24 which correspond to positions of the second seating component 14 relative to the first seating component required to accommodate children of different heights.

Preferably, a window 36 having a marker 38 is provided in the second connector member 32 through which the scale 34 may be viewed, as shown in FIGS. 7, 8, 9a and 9b.

Figure 10A:
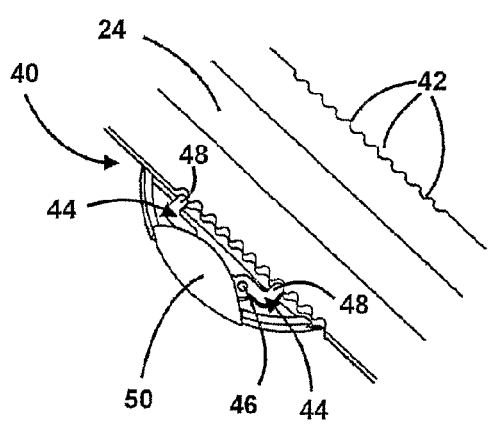
Figure 10B:
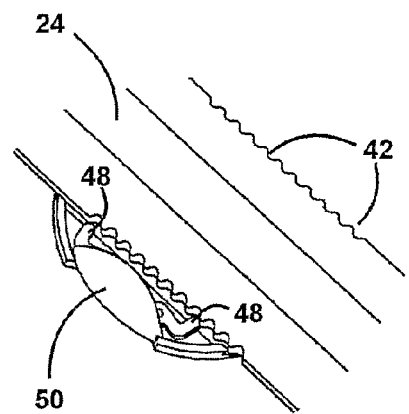

Such an arrangement allows a user to slide the second seating component 14 along the support frame 24 until the height of the child intending to sit in the seating system 10 is aligned with the marker 38 shown in the window 36, as shown in FIGS. 10a and 10b.

Once the position of the second seating component 14 relative to the first seating component 12 is adjusted as desired, it can be fixed in position on the support frame, preferably by means of a locking system 40, as shown in FIGS. 10a-10d. This enables the position of the second seating component 14 relative to the first seating component 12 to be adjusted quickly and accurately for children of different heights without having to adopt a trial and error approach.

The locking system 40 includes a plurality of equidistantly spaced recesses 42 formed along opposite edges of the support fame 24. Teeth 44 provided on the second connector component 32, on opposite sides of the support frame 24 (only one side being shown), are engageable within the recesses 42 to lock the second connector 32 in position, relative to the support frame 24, and prevent sliding movement of the second connector 32 on the support frame 24, as shown in FIG. 10a.

The teeth 44 are preferably mounted by means of pivot pins 46 that allow pivotal movement of the teeth 44 to move an engagement portion 49 of each tooth 44 into and out of engagement with a respective recess 42.

Each tooth 44 also preferably includes a cam portion (not shown) received within a release member 50 slidably mounted on the second connector component 32 such that on sliding movement of the release member 50 towards the support frame 24 the release member 50 engages the cam portion of each tooth 44 causing pivotal movement of the tooth 44 to move the engagement portion 49 of the tooth 44 out of engagement with the respective notch 42, as shown in FIG. 10b.

Figure 10C:
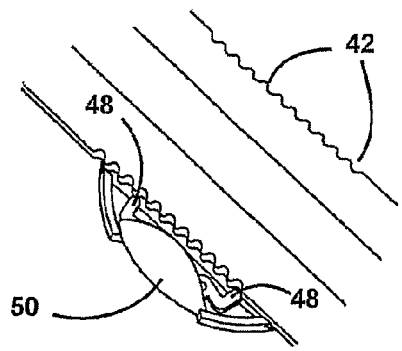

When the teeth 44 on each side of the support frame 24 are disengaged, the second connector member 32 is free to slide along the support frame 24, as shown in FIG. 10c, and thereby allow adjustment of the second seating component 14 relative to the first seating component 12.

Figure 10D:
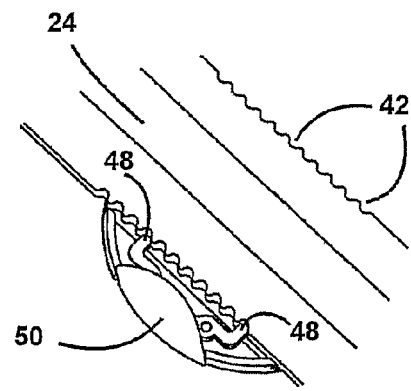

On sliding movement of the release member 50 away from the support frame 24, once adjustment is complete, engagement between the release member 50 and the cam portion of each tooth 44 preferably causes pivotal movement of the tooth 44 to move the engagement portion 48 of the tooth 44 into engagement with an adjacent recess 42, as show in FIG. 10d.

Preferably the release member 50 and the teeth 44 are resiliently biased such that the release member 50 atomically moves away from the support frame 24 when released and on movement of the release member 50 away from the support frame 24 and out of engagement with the cam portion of each tooth 44, a resilient biasing member causes pivotal movement of the tooth 44 to move the engagement portion 48 into engagement with a recess 42. This allows the provision of resiliently biased, depressible buttons on opposite sides of the support frame 24 to facilitate adjustment of the second seating component 14 relative to the first seating component 12.

Preferably, the connecting arrangement also includes a third connector member 52 mounted on an elongate strut member 54 (FIG. 11), which is slidably received within the support frame 24.

Sliding movement of the strut member 54 into and out of the support frame 24 provides means for adjusting the position of the third seating component 14 relative to the second seating component 14, as exemplified by the relative positions of the seating components 14,20 shown in FIGS. 5 and 6.

When the third seating component 20 is positioned in a desired position relative to the second seating component 14, the third seating component can be fixed in position relative to the support frame 24, preferably by means of a locking system. The locking system may take a similar form to the locating system 40 associated with the second seating component 14.

In the embodiment shown in FIGS. 1 and 2, the connecting arrangement defines spaced locators 56,58 to receive and locate a vehicle seat belt 60 when the seat belt 60 is passed across the seating components 12,14,20 during fitment of the seating system 10 on a vehicle seat.

The provision of the locators 56,58 allows a user to pass the seat belt 60 across the front of the seating components 12,14, 20 (FIG. 12a) so as to align the shoulder strap 62 with an opening between the second and third seating component 14,20 and the waist strap 64 with an opening between the first and second seating components 12,14 (FIG. 12b). On tightening the seat belt 60 to increase the tension in the shoulder and waist straps 62,64 the shoulder strap 62 is pulled tightly against a locator 56 defined by the support frame 24 and the second connector member 32 and the waist strap 64 is pulled tightly against a locator 58 defined by the floor-engaging support member 22 (FIG. 12c). The locators 56,58 thereby receive and locate the shoulder and waist straps 62,64 and maintain the in position so that the seating system 10 can be pulled tightly against the vehicle seat.

This arrangement enables a user to fit the seating system 10 on a vehicle seat without having to locate the seat belt 60 though any connecting members provided on the rear of the seating system. Consequently the user does not need to be able to see and reach behind the seating system 10.

In the embodiment shown in FIGS. 1 and 2, the seating system 10 includes first and second stabilizer components 66,68 which define spaced contact points at the rear of the seating system 10 to support the seating system 10 when it is fitted on a vehicle seat.

Figure 7:
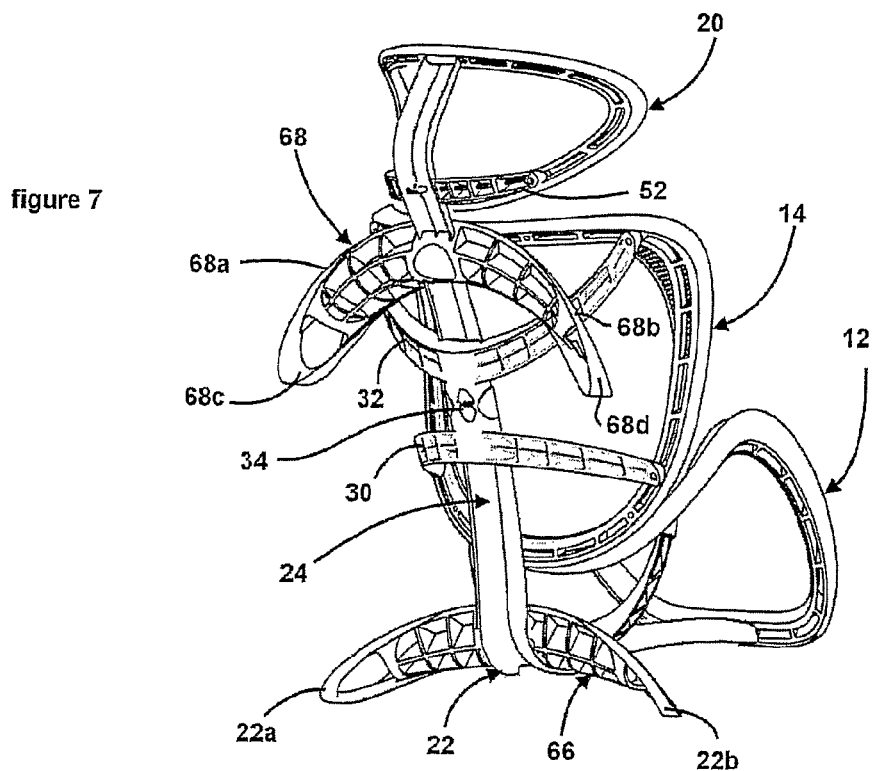
FIGS. 7 and 8 are a rear perspective view and a rear elevational view of the seating system of FIGS. 1 and 2.
Figure 8:
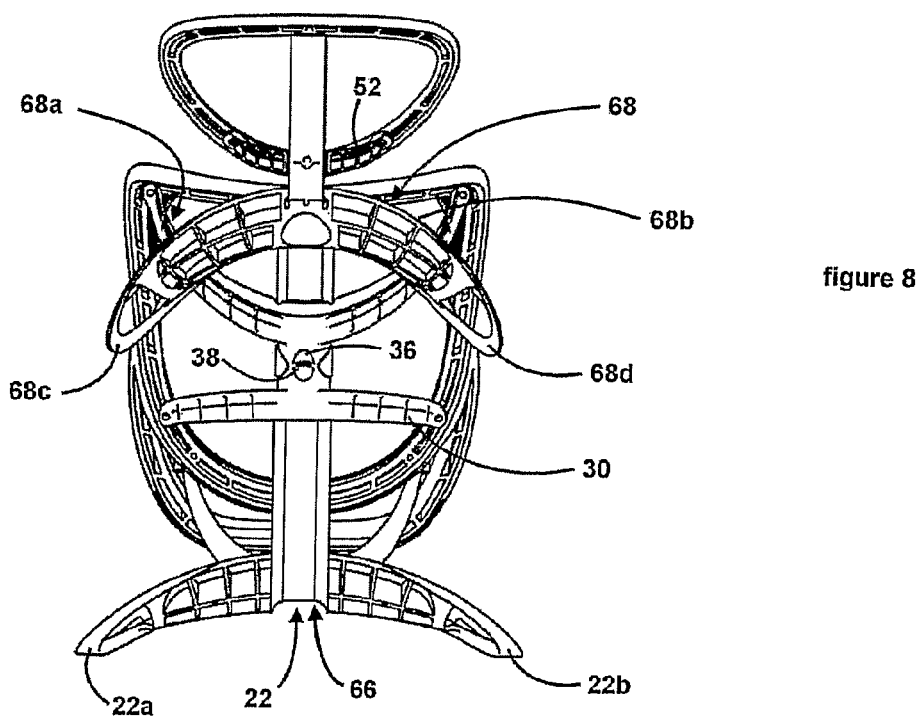

Preferably the first stabilizer component 66 is formed integrally with the floor engaging support 22 to define two laterally extending limbs 22a and 22b defining contact points at their terminal ends, as shown in FIGS. 7 and 8.

Preferably, the second stabilizer component 68 is mounted at or towards the top of the support frame 24 to define two laterally extending limbs 68a,6857b also defining contact points at their terminal ends, as shown in FIGS. 7 and 8. A contact pad 68c,68d may be provided on the terminal end of each of the limbs 69a,68b to reduce pressure between the terminal ends and the vehicle seat and thereby reduce the risk of the terminal ends dig or otherwise marking the vehicle seat when the seating system 10 is fitted thereon and held against the vehicle seat by the seat belt 60.

The provision of the laterally spaced contact points supports the seating system 10 when fitted on a vehicle seat, thereby preventing the seat system pivoting about the support frame 24 and ensuring that the seating system is stable on the vehicle seat.

The laterally spaced contact points together with a lower edge of the first seating component 12, which is also preferably in contact with the vehicle seat when the seating system 10 is mounted on the vehicle seat (as shown in FIGS. 5 and 6), define a five-point contact arrangement to support the seating system 10 and assist in preventing twisting and tipping of the seating system 10 on the vehicle seat.

Preferably, a child is restrained in the seating system 10 by means of a five-point strap system 70, as shown in FIG. 13.

The five-point strap system 70 includes four static fixing points 70a-70d on the Same of the second seating component 14 so that a strap passed over each shoulder of the child, and a strap extends around the waist of the child from opposite sides of the second seating component 14.

Preferably a tensioning web 72 is secured at one end to the flexible membrane 18 of the first seating component 12 to extend between the legs of the child to meet the other straps at the middle of the child's waist. At this point, preferably the tensioning web 72 and the straps are interconnected by means of buckle 74. The tensioning web 72 can then preferably be adjusted in length to increase tension in the shoulder straps and thereby ensure that the child is restrained securely in the seating system 10.

As can be seen in FIG. 2, the seating components 12,14,20 include side bumper members 76,78,80 mounted on either side thereof along a section of the respective frame 16.

Each of the bumper members 76,78 provided on the first and second seating components 12,14 includes a vented fin 82,84 formed from a resiliently deformable material, which deforms on contact so as to absorb energy should a child sitting in the seating system 10 move towards the respective frame 16.

Each of the bumper members 80 provided on the third seating component 20 includes a fin 86 formed from a resiliently deformable material which deforms on contact so as to absorb energy should the head of a child sitting in the seating system 10 move towards the respective frame 16.

The provision of the bumper members 76,78,80 thereby further minimizes the risk of discomfort or injuries that may otherwise result from contact between a child seated in the seating system 10 and the respective frames 16 when a vehicle in which the seating system 10 is fitted decelerates or turns, for example.

In other embodiments, the provision of vented and/or non-vented fins in the bumper members 76,78,80 may vary. For example, the bumper member 80 of the third seating component 20 may include a vented fin 86 as shown in FIG. 14. In yet father embodiments, the bumper members 76,78,80 may be omitted.

A child vehicle seating system 90 according to another embodiment of the invention is shown in FIGS. 15-18.

The seating system 90 includes first and second seating components 92,94 interconnected to define a seat and a back, each of the seating components 92,94 including a closed frame 96 over which a membrane 98 is stretched to define a support surface.

The closed frame 96 of each of the seating components 92,94 is preferably shaped so that the flexible membrane stretched over the frame 96 forms a contoured surface.

In a similar manner to the embodiment described with reference to FIGS. 1 and 2, the frames 96 of the seating components 92,94 ate shaped to curve around a child seated in the seating system 90 to support the child and resist sideways movement of the child.

Similarly, the frames 96 are shaped such that the support provided by each of the seating components 92,94 is provided solely by the flexible membrane 98 stretched over the associated frame 96, thereby minimizing contact between a child seated in the seating system 90 and solid components of the seating system 90.

The flexible membrane 98 is preferably a porous, breathable fabric to ventilate the seating components 92,94 and, in the embodiment shown in FIGS. 15-18, is a mesh fabric.

The first ad second seating components 92,94 are interconnected by means of a connecting arrangement including a floor-engaging support member 100, which preferably assists to maintain the seating system 90 in an upright position when the seating system 90 is positioned on a flat surface, such as the floor.

The connecting arrangement also preferably includes a U-shaped handle 102, where the terminal ends of the handle 102 are mounted to connector members 104 connected between the first and second seating components 92,94 on opposite sides of the seating system 90.

Figure 15:
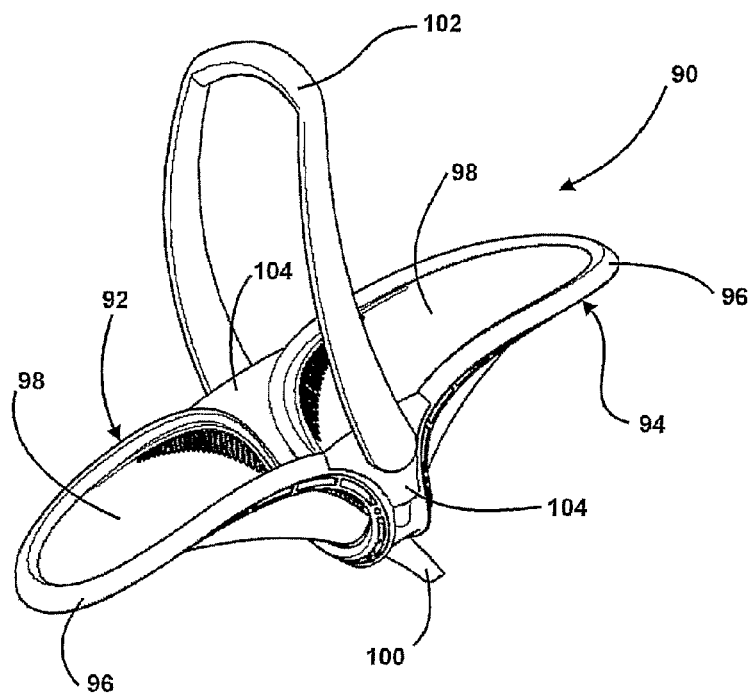
Figure 16:
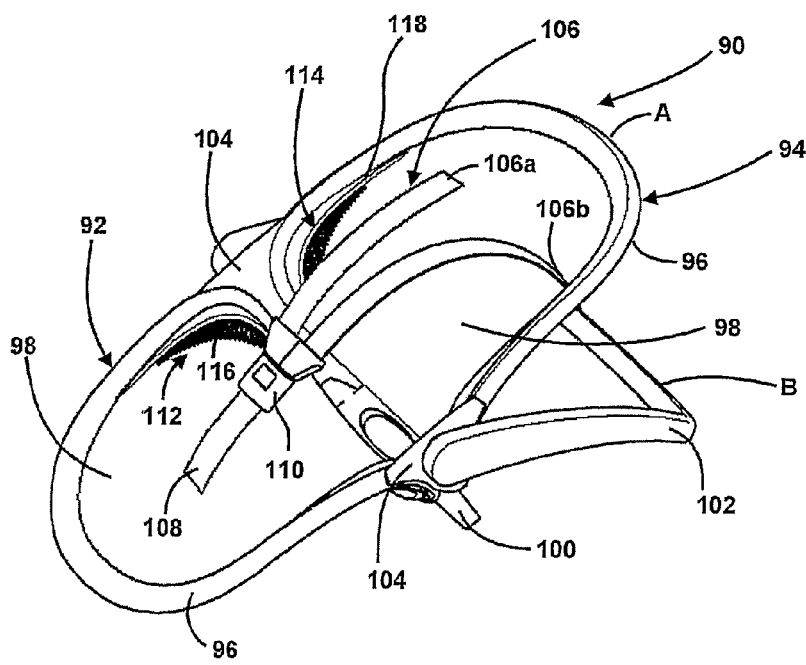
Figure 17:
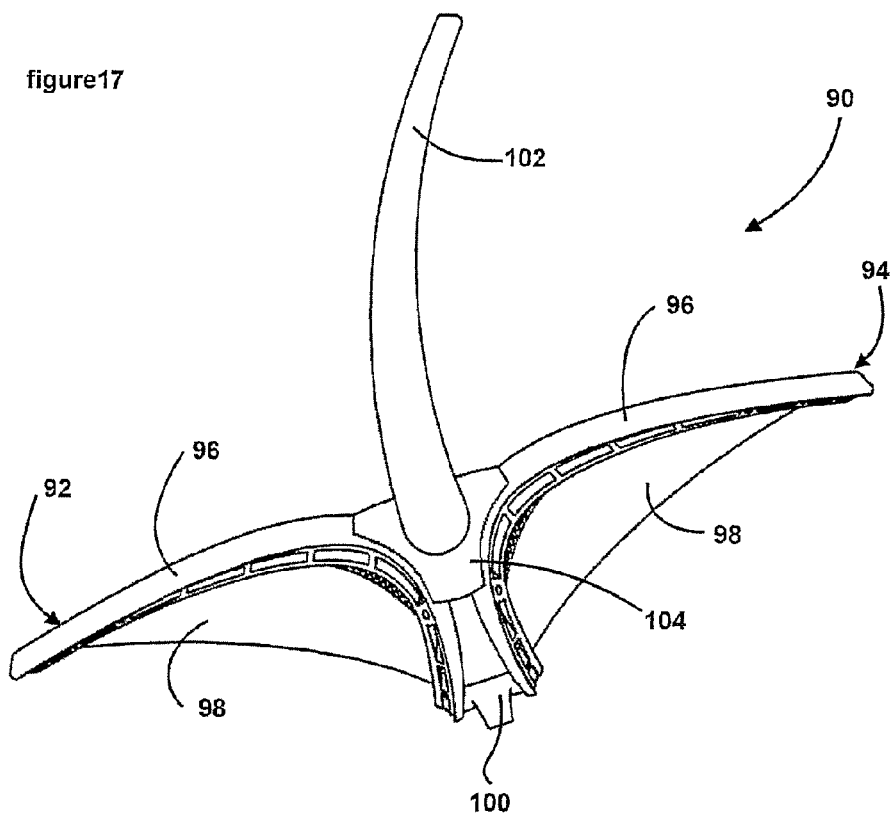
Figure 18:
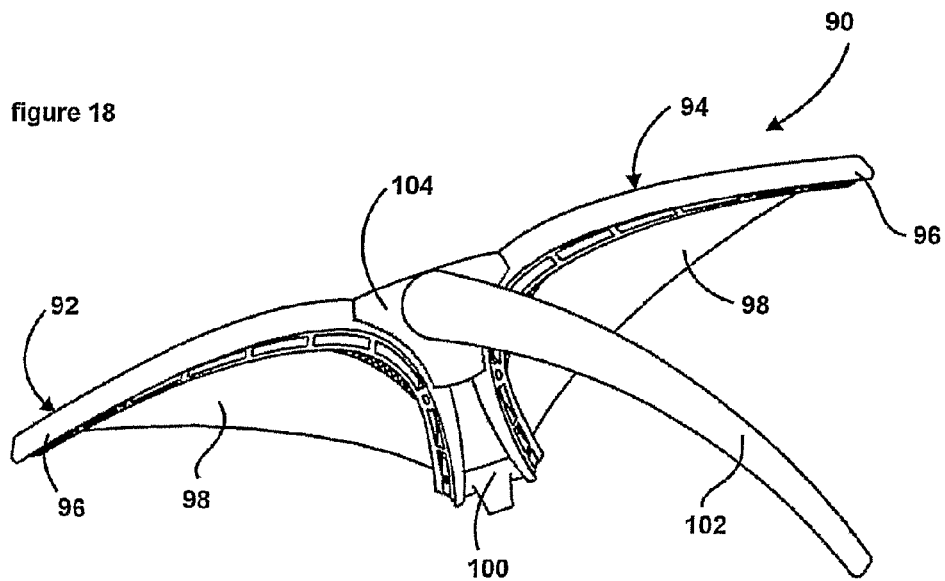

The handle 102 is preferably mounted to each of the connector members 104 by means of a pivot such that the handle 102 is pivotal from a first, carrying, position where the handle 102 extends above the first and second seating components 92,94, as shown in FIGS. 15 and 17, to a second, support, position where the handle 102 extends behind the second seating component 94, as shown in FIGS. 16 and 18.

In the embodiment shown in FIGS. 15-18, the second seating component 94 and the handle 102 (in its second support position) define spaced location points A, B (FIG. 18) to locate a vehicle seat belt (not shown) when the seating system 90 is positioned on a vehicle seat such that a child seated in the seating system 90 is the rear of the vehicle seat and the seat belt is passed around the back of the seating components 92,94.

The shoulder strap is preferably located at location point A along an uppermost edge of the frame 96 of the, second seating component 94, and the waist strap is preferably located across the width of the handle 102, at location point B, at a position spaced from the end of the handle 102.

Preferably a child is restrained in the seating system 90 by means of a three-point strap system 106, as shown in FIG. 16.

The three-point strap system 106 preferably has two fixing points 106a,106b in the flexible membrane 98 of the second seating component 94 so that a strap passes over each shoulder of a child and expands towards their waist.

Preferably a tensioning web 108 is secured at one to the flexible membrane 98 of the first seating component 92 to extend between the legs of the child to meet the other straps at the middle of the child's waist. At this poi, preferably the tensioning web 108 and the straps are interconnected by means of a buckle 110.

The tensioning web 108 can then preferably be adjusted in length to increase tension in the shoulder straps and thereby ensure that the child is restrained securely in the seating system 90.

As can be seen in FIG. 15, the first and second seating components 92,94 include bumper members 112,114 mounted on either side thereof along a section of the respective fame 96.

Each of the bumper members 112,114 includes a vented fin 116 formed from a resiliently deformable material, which deforms on contact so as to absorb energy should a child sitting in the seating system 90 move towards the respective fame 96.

As with the embodiment described with reference to FIGS. 1 and 2, the provision of the bumper members 112,114 further minimizes the risk of discomfort or injuries that may others result from contact between a child seat in the seating system 90 and the respective frames 96 when a vehicle in which the seating system 90 is fitted decelerates or turns, for example.

In other embodiments, the bumper members 112,114 may include non-vented fins formed from a resiliently deformable material. In yet further embodiments the bumper members 112,114 may be omitted.

A child vehicle seating system 120 according to a yet further embodiment of the invention is shown in FIG. 19.

The seating system 120 includes a single seating component 122 defining a seat, the seating component 122 including a closed fame 124 over which a membrane 126 is stretched to define a support surface.

The closed frame 124 of the seating component 122 is preferably shaped so that the flexible membrane 126 stretched over the fame 124 forms a contoured surface.

In a similar manner to the embodiments described with reference to FIGS. 1, 2 and 15-18, the frame 124 of the seating component 122 is shaped to curve around a child seated on the seating system 120 to support the child and resist sideways movement.

Similarly the fame 124 is shaped such that the support provided by the seating component 122 is provided solely by the flexible membrane 126 stretched over the frame 124, thereby minimizing contact between a child seated on the seating system 120.

The flexible membrane 126 is preferably a porous, breathable fabric to ventilate the seat component 122 and, in the embodiment shown in FIG. 19, is a mesh fabric.

In the embodiment shown in FIG. 19, the seating component 122 includes a bumper member 128 mounted on either side thereof along a section of the frame 124. Each bumper member 128 includes a vented fin 130 formed from a resiliently deformable material, which deforms on contact so as to absorb energy should a child sitting in the seating system 120 move towards the frame 124.

As with the embodiments described with reference to FIGS. 1, 2 and 15-18, the provision of the bumper members 128 fiber minimizes the risk of discomfort or injuries that may otherwise result from contact between a child seated in the sealing system 120 and the frame 124 when a vehicle in which the seating system 120 is fitted decelerates or turns, for example.

In other embodiments, the seating component 122 may include bumper members 130 having non-vented fins formed from a resiliently deformable material. In yet, further embodiments, the bumper members 130 may be omitted.

A frame element 132, suitable for use in constructing the closed frames 16,96,124 of each of the seating components of the seating systems 10,90,120 shown in FIGS. 1-19, is shown in cross-section in FIGS. 20a-20f.

The frame element 132 includes an elongate body 134 which, in cross-section, has a generally U-shaped profile defining spaced inner and outer limbs 136,138 depending from one face 140 of a base 142 to form an open mouthed channel 144, as shown in FIG. 20a.

The terminal ends 146,148 of the limbs 136,138 define a support to receive a flexible membrane 150 stretched over the fame element, and the elongate body 134 is adapted to engage the membrane 150 when the membrane 150 is wrapped around the elongate body 134 and laid across the open mouth of the channel 148, as shown in FIG. 20b, to prevent the membrane 150 being drawn from the inner limb 136 towards the outer limb 138.

In the arrangement shown in FIG. 20b, this engagement is effected by means of barbs 152 provided along the terminal end 146 of the inner limb 136, which, in use, protrude into, and thereby grip, the flexible membrane 150.

The frame element also preferably includes a rib 154 protruding from the opposite face 156 of the base 142 to the inner and outer limbs 136,138, in alignment with the outer limb 138.

The frame element may be a cast member or an extruded member depending on the material from which the frame element is formed.

In use, one end of a flexible membrane 150 is anchored along the terminal end 146 of the inner limb 136 of a frame element, along the inner edge of the open mouth of the channel 144, by means of the barbs 152.

The membrane 150 is then wrapped around the frame element such that the membrane 150 overlies the open mouth of the channel 144.

The membrane 150 is then stretched around an opposed frame element (not shown) such that the membrane 150 overlies the open mouth of the channel 144 in the opposed frame element, and is anchored to the terminal end 146 of the inner limb 136 of the opposed frame element, along the inner edge of the open mouth of the channel 144 of the opposed frame element, by means of the barbs 152.

The provision of the rib 154 protruding from the opposite face 156 of the base 142 of each of the frame elements acts to space the membrane 150 from the base 142 of each of the frame elements.

In order to secure the membrane 150 to each of the frame elements, and to increase the degree of stretch in the membrane 150, a push-in anchor member 158 may be inserted into the open mouthed channel 144 of each of the frame elements, as shown in FIGS. 20c and 20d.

On insertion of the push-in anchor member 158 into the open mouthed channel 148 of each of the frame elements, the membrane 150 is dram into the channel 144 over the outer limb 138 of the respective Same element, thereby increasing the degree of tension in the membrane 150.

The push-in anchor member 158 is preferably formed from a resiliently deformable material, and the inner and outer limbs 136,138 of each of the frame elements and the push-in anchor member 15 are preferably shaped to resist disengagement of the push-in anchor member 158 once the push-in anchor member 158 is inserted into the respective channel 144.

To resist creep of the membrane 150 and the push-in anchor member 158 along the length of the channel 144 in each frame element, the side walls of the inner and outer limbs 136,139 within the channel 144 of each of the fame elements may include a plurality of spaced blade members (not shown) which engage the membrane 150 on insertion of the push-in anchor member 158 into the cannel 144.

In the embodiment shown in FIGS. 20c and 20d, a shield 160 is attached along an outer edge of the push-in anchor member 158 in the form of a wing which can be folded over the outer edge of the elongate body 134 of the frame element to overlie the membrane 150 stretched around the frame element, as shown in FIGS. 20e and 20f.

The shield 160 is preferably formed from a resiliently deformable material to protect the membrane 150 wrapped around the frame element, and may be formed integrally with the push-in anchor member 158:

In other arrangements, the rib 154 may be omitted.

It is also envisaged that the base 142 need not be a continuous member extending along the entire length of the Same element 132. The base 142 could in other arrangements include a plurality of equidistantly spaced base members 142a extending between the inner and outer limbs 136,138 as shown in FIG. 4.

The invention claimed is:

1. A child vehicle seating system, for fitment on a vehicle seat to support and restrain a child, comprising at least one seating component, the at least one seating component including a closed frame over which a flexible membrane is stretched to define a support surface, and further including a second seating component interconnected with the at least one seating component to define a seat and a back, the second seating component including a second closed frame over which a second flexible membrane is stretched to define a second support surface, wherein the first and second seating components are interconnected by means of a connecting arrangement including a floor-engaging support member, wherein the connecting arrangement further includes a support frame interconnecting the seating components and including adjustment means to adjust relative positions of the seating components through a range of predetermined positions to accommodate children of different heights.

2. The child vehicle seating system according to claim 1 further including a third separate seating component having a third closed frame over which a third flexible membrane is stretched to define a third support surface, the first, second and third seating components being interconnected to define the seat, the back and a head rest.

3. The child vehicle seating system according to claim 2 wherein each of the closed frames is shaped such that the flexible membrane stretched over the frame forms a contoured support surface.

4. The child vehicle seating system according to claim 2 wherein the flexible membrane is formed from a porous breathable fabric.

5. The child vehicle seating system according to claim 4 wherein the porous breathable fabric is a mesh fabric.

6. The child vehicle seating system according to claim 1 further including spaced seat belt locators to receive and locate a vehicle seat belt when the seat belt is passed across the seating system in order to enable fitment of the seating system on the vehicle seat.

7. The child vehicle seating system according to claim 6 wherein the connecting arrangement defines the seat belt locators.

8. The child vehicle seating system according to claim 7 wherein the closed frame includes a frame element having an elongate body which in cross-section has a generally U-shaped profile defining spaced inner and outer limbs depending from one face of a base to form an open mouthed channel to receive a push-in anchor member, terminal ends of the limbs defining a support to receive the flexible membrane stretched over the frame element and the elongate body being adapted to engage the membrane when wrapped around the elongate body and laid across the open mouth of the channel to prevent the membrane being drawn into the channel from the inner limb when the push-in anchor member is inserted into the channel so as to encourage the membrane to be drawn into the channel over the outer limb and thereby increase the degree of tension in the membrane.

9. The child vehicle seating system according to claim 8 wherein the inner limb includes a plurality of barbs which engage the flexible membrane when it is laid across the open mouth of the channel to prevent the membrane being drawn into the channel from the inner limb when the push-in anchor member is inserted into the channel so as to encourage the membrane to be drawn into the channel over the outer limb and thereby increase the degree of tension in the membrane.

10. The child vehicle seating system according to claim 9 wherein the inner and outer limbs and the push-in anchor member are shaped to resist disengagement of the push-in anchor member when the push-in anchor member is inserted into the channel.

11. The child vehicle seating system according to claim 10 wherein the elongate body further includes a rib protruding from an opposite face of the base to the limbs, in alignment with the outer limb, to guide the flexible membrane over the elongate body while spacing the membrane from the base.

12. The child vehicle seating system according to claim 11 wherein a plurality of spaced blade members are formed on side walls of the limbs within the channel to engage the flexible membrane on insertion of the push-in anchor member into the channel and resist creep of the flexible membrane and the push-in anchor member in a direction along the length of the channel.

13. The child vehicle seating system according to claim 12 further including a resilient shield member attached to the push-in anchor member in the form of a wing which folds over an outer edge of the elongate body to overlie the flexible membrane stretched around the outer edge of the elongate body.

14. The child vehicle seating system according to claim 13 wherein the at least one of the seating components includes a side bumper member mounted along a section of the respective frame at either side thereof to absorb energy from the child sitting in the child vehicle seating system as the child moves towards the respective frame.

15. The child vehicle seating system according to claim 14 wherein each side bumper member includes a vented fin formed from a resiliently deformable material which deforms on contact so as to absorb the energy from the child sitting in the child vehicle seating system as the child moves towards the respective frame.

* * * * *